Nov. 9, 1948.  P. KEMENY  2,453,517
VARIABLE SPEED TRANSMISSION MECHANISM
Filed June 28, 1946  2 Sheets-Sheet 2
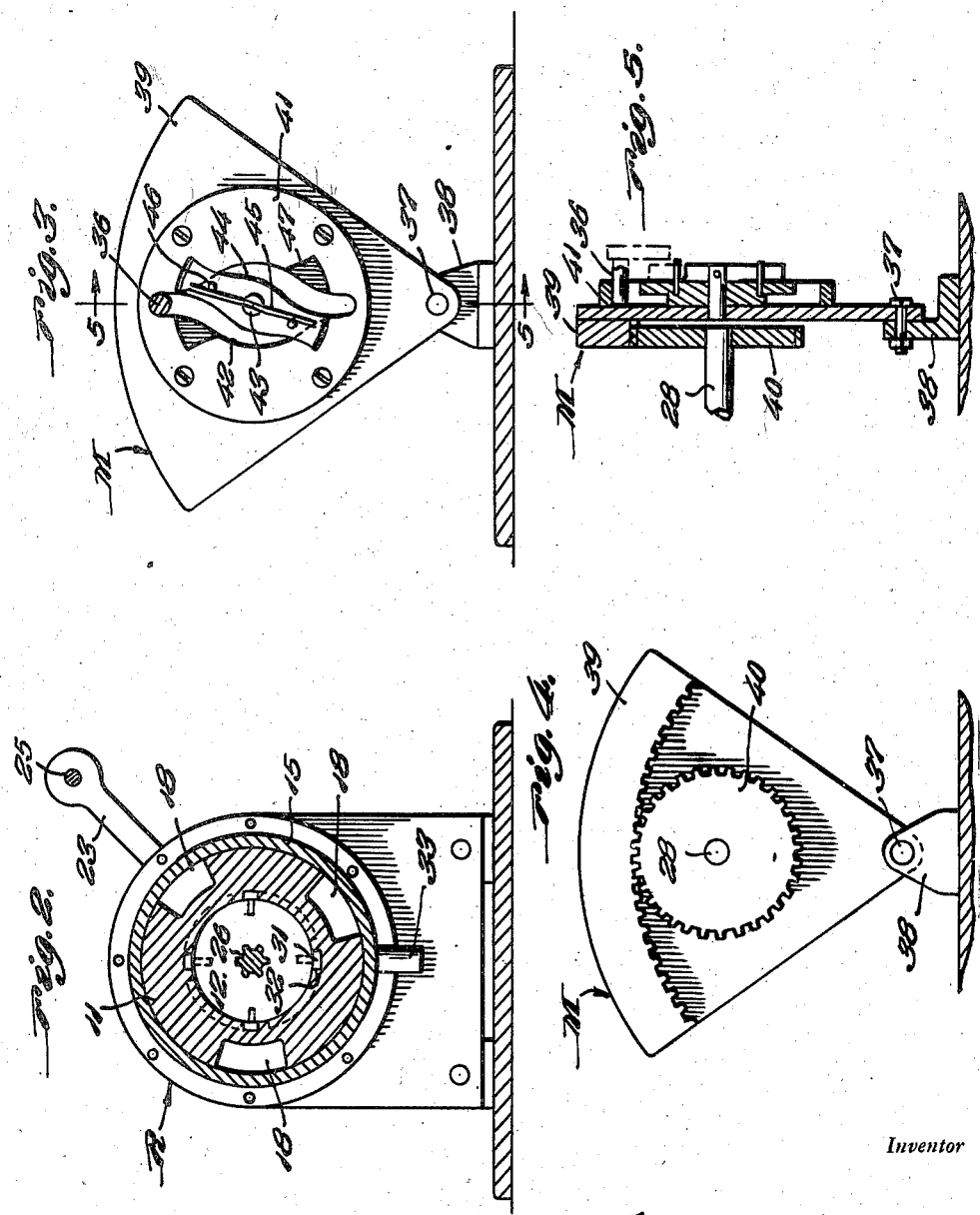

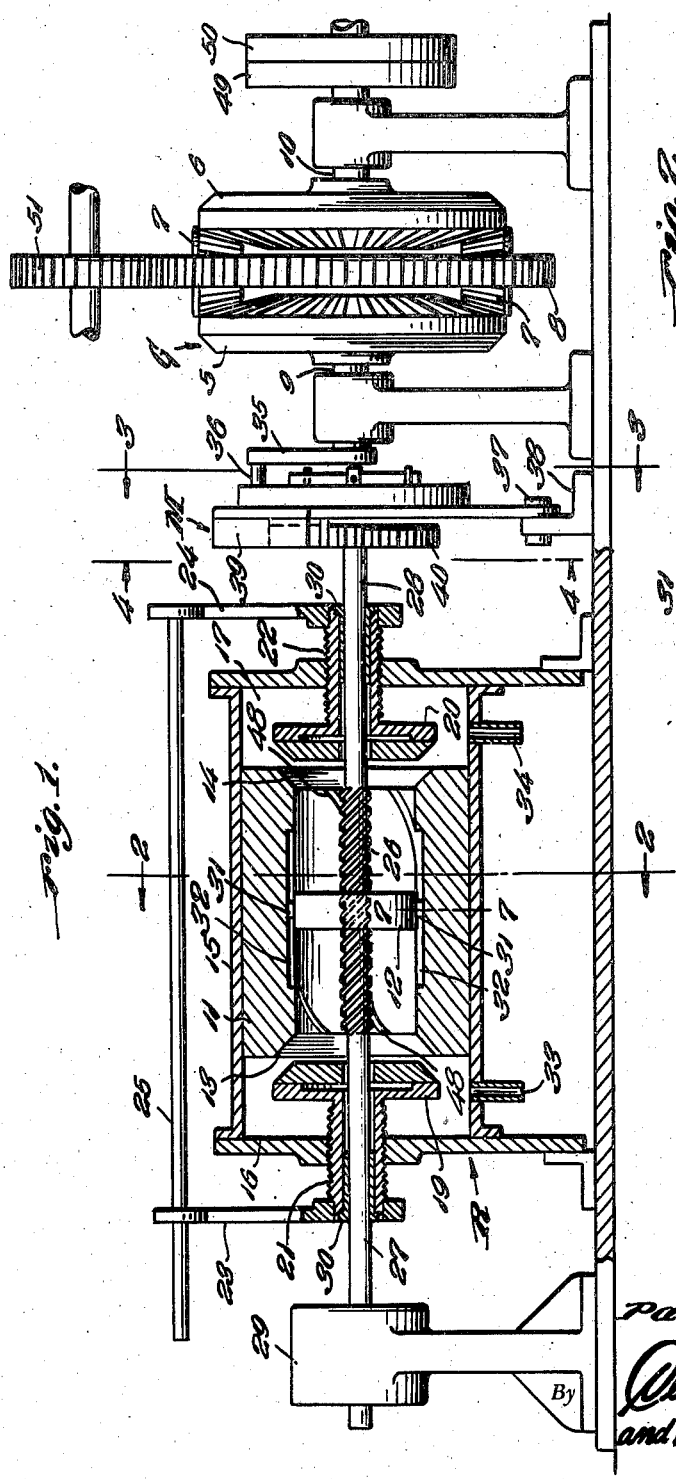

Patented Nov. 9, 1948

2,453,517

UNITED STATES PATENT OFFICE 2,453,517

VARIABLE-SPEED TRANSMISSION MECHANISM

Paulo Kemeny, Sao Paulo, Brazil

Application June 28, 1946, Serial No. 680,003
In Brazil July 10, 1945

2 Claims. (Cl. 74—293)

This invention relates to improvements in variable speed transmission mechanisms, and the primary object of the invention is to provide a mechanism of this kind by means of which the speed of driven machinery may be very gradually changed so as to provide for smooth and gradual acceleration or deceleration of speed of the driven machinery.

More specifically, the present invention contemplates a variable speed transmission mechanism embodying a planetary type differential gearing having two differential gears and a ring gear, power means for driving one of said gears, means to operatively connect another of said gears to the machinery to be driven, and manually-controlled hydraulic means to regulate the speed of the remaining gear for gradually varying the speed of said machinery.

The exact nature of the present invention, as well as more specific objects and features thereof, will become apparent from the following description when considered in connection with the accompanying drawings, in which:

Figure 1 is a view, partly in elevation and partly in section, of one form of variable speed transmission mechanism constructed in accordance with the present invention;

Figure 2 is a transverse section through the speed regulator, taken on line 2—2 of Figure 1;

Figure 3 is a transverse section taken on line 3—3 of Figure 1;

Figure 4 is a transverse section taken on line 4—4 of Figure 1;

Figure 5 is a vertical section taken on line 5—5 of Figure 3;

Figure 6 is a perspective view of the piston forming part of the regulator shown in Figure 1;

Figure 7 is an enlarged fragmentary section taken on line 7—7 of Figure 2.

Referring in detail to the drawings, the present transmission mechanism embodies a planetary type differential gearing G, and a manually controlled hydraulic regulator R or R' for regulating the speed of one of the gears of said differential gearing. The differential gearing includes the usual two differential gears 5 and 6, the usual differential or spider pinions 7 arranged between and meshing with the differential gears 5 and 6, an the usual ring gear 8 carried by the spider on which the pinions 7 are journaled. Also, the differential gears 5 and 6 are secured on the usual separate aligned shafts 9 and 10, respectively. The speed of either differential gear 5 or 6 or of the ring gear 8 may be controlled by the regulator, one of the remaining gears being power driven, and the other of said remaining gears being operatively connected to the machinery to be driven.

In the embodiment shown, the regulator R is in the general nature of an adjustable dash pot of special and improved construction. It consists of a cylinder 11 having a piston 12 reciprocable therein, said cylinder having open ends formed with valve seats 13 and 14. The cylinder 11 is mounted within a closed casing 15 centrally between the ends of the latter, and this casing is longer than the cylinder 11 so that fluid chambers 16 and 17 are provided therein at opposite ends of the cylinder. Cylinder 11 is further provided with longitudinal external grooves 18 which place the chambers 16 and 17 in communication with each other outside the cylinder and within the casing. Movable toward and from the seats 13 and 14 so as to variably restrict the open ends of the cylinder 11 are valve heads 19 and 20 that are disposed in the chambers 16 and 17 and carried by threaded stems 21 and 22 having threads of high lead angle and adjustably threaded through the ends of casing 15. Secured on the outer ends of the stems 21 and 22 are levers 23 and 24 which are connected by a rod 25 for simultaneous and similar movement manually so as to adjust the valve heads 19 and 20 simultaneously and to a corresponding extent toward or from the seats 13 and 14. A screw shaft 26 extends through and has threaded engagement in the piston 12, and said screw shaft is provided with smooth end portions 27 and 28 which are journaled in the stems 21 and 22 and project outwardly therethrough. The outer end of shaft portion 26 may be journaled in a bearing 29, and suitable packing means 30 may be provided to prevent leakage of fluid from the chambers 16 and 17 between the stems 21 and 22 and the shaft portions 27 and 28. In order to restrain the piston 12 against rotation with the shaft 26 and relative to the cylinder 11 for the major portion of its stroke, said piston is provided with peripheral lugs 31 engaging in longitudinal grooves 32 provided in the inner surface of the cylinder 11. It will thus be apparent that when shaft 26 is rotated in one direction, piston 12 will be moved to the right of Figure 1, and when said shaft is reversely rotated, the piston 12 will be moved to the left of Figure 1. Accordingly, by imparting a reciprocating rotary motion to shaft 26, the piston 12 may be reciprocated in the cylinder 11. Obviously, by varying the degree of opening of the valve heads 19 and 20, the speed of movement of piston 12 and consequently the speed of rotation of shaft 26 may be gradually varied. The action is obviously dependent upon the volume of fluid allowed to escape from the cylinder 11 past the valve heads 19 and 20 within a given period of time, thereby correspondingly regulating the speed of travel of the piston 12. As the fluid is forced out of either end of the cylinder by travel of the piston 12 toward that end, the expelled fluid is allowed to flow into the opposite end of the cylinder by way of the grooves or passages 18. The casing 15 may have connections 33 and 34 so that the fluid may be circulated through a heat exchanger for being kept at a desired temperature by dissipation of excessive heat therefrom.

In this embodiment, the screw shaft 26 is driven from the shaft 9 of differential gear 5, suitable mechanism M being provided for converting the continuous rotary motion of shaft 9 into rotary reciprocating movement of shaft 26. The mechanism M includes a crank 35 secured on the shaft 9 and provided with a crank pin 36. Pivotally mounted at 37 upon a bracket 38 for oscillating movement transversely of the shafts 9 and 26 is an internal segment gear 39 that meshes with a spur gear 40 secured on the end of shaft portion 28 of worm shaft 26. Secured to one face of the segment gear 39 is a plate 41 formed with a central elongated slot 42, the opposite side walls of which are in the form of sine curves. Pivoted to the segment gear 39 within the slot 42 and centrally between its ends is an elongated gate or switch plate 44. The plate 44 is normally yieldingly swung in one direction by means of a spring 45 which has its intermediate portion received and secured in a slot of the pivot 43 and has its opposite ends engaged with pins 46 carried by the plate 44 near opposite ends thereof. Recesses 47 are provided in the plate 41 near and at opposite sides of opposite end portions of the slot 42, the arrangement being such that the ends of the gate plate 44 are movable into these recesses. The crank pin 36 projects into the slot 42. Assuming that the crank pin 36 rotates in a clockwise direction as viewed in Figure 3, and that said crank pin 36 is at the bottom of the slot 42, the crank pin 36 will move upwardly at the right side of switch plate 44 and thereby swing the segment gear 39 to the left so as to rotate the gear 40 and worm or screw shaft 26 in a counter-clockwise direction. This causes piston 12 to be moved in one direction, and as the crank pin 36 approaches the top of slot 42, it swings the switch plate 44 against the action of spring 45 and then passes above the switch plate 44 to the top of the slot 42 as shown by full lines. The switch plate 44 is then instantly returned to its normal position of Figure 3 so that upon continued rotation of crank pin 36, the latter rides against the left side of switch plate 44 and causes segment gear 39 to swing to the right of Figure 3. This causes rotation of gear 40 and screw shaft 26 in the reverse or clockwise direction, thereby causing the piston 12 to move in the opposite direction. It will thus be apparent that shaft 26 is actuated by shaft 9 through the mechanism M to cause reciprocation of piston 12, the speed of rotation of shaft 9 being governed by the resistance offered to movement of piston 12 according to the degree of opening or closing of valves 19 and 20. As the crank pin 36 approaches the bottom of slot 42, it swings the switch plate 40 against the action of spring 45 and passes the lower end of said switch plate into the lower end portion of slot 42. This causes release of switch plate 44 so it is promptly returned to its normal position as shown. The cycle of operation described is repeated as long as the shaft 9 is driven. It is not practical to give the sides of the slot 42 a sharp 45° angle intermediate the ends of said slot, as required to provide for oscillation of the segment gear 39 at a uniform speed. Accordingly, by curving the sides of slot 42 intermediate its ends, the segment gear 39 has the speed of movement thereof slowed slightly at the end of each oscillation thereof. In order to compensate for this and obtain uniform speed of travel of piston 12 throughout each stroke of the latter, means is provided to permit limited rotary movement of piston 12 at the ends of its strokes. For this purpose, spiral grooves 48 are provided in the cylinder 11 at the ends thereof so as to lead from the ends of the straight grooves 32. Thus, as the piston 12 approaches the ends of its strokes, the lugs 31 pass from the straight grooves 32 into the spiral grooves 48 and permit the mentioned limited rotary movement of the piston. This results in a slight increase in speed of travel of the piston to offset the slight slowing up in the speed of rotation of shaft 26 at these times.

Fast and loose pulleys 49 and 50 may be provided on the shaft 10 for respectively transmitting motion to said shaft 10 from a source of power and for throwing the mechanism out of operation. Power may be transmitted as indicated at 51 from the ring gear 8 to the machinery to be driven.

In operation, shaft 10 is driven so as to rotate the spider pinions 7 and either cause them to travel in an orbit about the axes of shafts 9 and 10 with corresponding rotation of ring gear 8, or to cause driving of differential gear 5. If gear 5 is prevented from turning at all, power is transmitted from ring gear 8 at the full speed of driven shaft 10. The speed of transmission is, therefore, correspondingly reduced according to the speed of rotation permitted gear 5. In turn, the speed of rotation permitted gear 5 depends upon the resistance offered to turning of said gear through the regulator R. It will thus be readily apparent that by adjusting the valve heads 19 and 20 the speed of the driven machinery may be very gradually changed as required and in accordance with the torque or load to be overcome.

From the foregoing description, it is believed that the construction, operation and advantages of the present invention will be readily understood and appreciated by those skilled in the art. In the disclosed embodiment, manually controlled hydraulic means is provided to regulate the speed of one gear of the differential gearing, a second gear of said differential gearing being driven, and the remaining or third gear thereof being operatively connected to the machinery to be driven. A very gradual change in speed may thus be effected with respect to the driven machinery so as to insure smooth operation and gradual acceleraton or deceleration of the machinery. Minor changes and modifications are contemplated such as fall within the scope of the invention as claimed.

What I claim is:

1. A variable speed transmission mechanism comprising, in combination, a planetary type differential gearing having two differential gears and a ring gear, power means for driving one of said gears, means to operatively connect another of said gears to machinery to be driven, and manually-controlled hydraulic means to regulate the speed of the remaining gear for gradually varying the speed of said machinery, said hydraulic means comprising a cylinder having a piston reciprocable therein, means affording circulation of fluid outside said cylinder from either end of the latter to the opposite end thereof, manually adjustable means for adjustably restricting the flow of fluid correspondingly and simultaneously into or out of the opposite ends of said cylinder, a screw shaft for actuating said piston, and mechanism operatively connecting said screw shaft with the associated gear of the differential gearing so as to convert continuous rotary motion of said gear in one direction to reciprocating rotary motion of said screw shaft.

2. In a variable speed transmission mechanism, a speed regulator comprising a casing, a cylinder mounted in the casing and having open ends, said cylinder being shorter than the casing and disposed intermediate the ends of the latter to provide chambers within the casing at opposite ends of the cylinder, said cylinder having external passages affording communication between said chambers between the cylinder and the casing, manually operable valves for simultaneously and correspondingly regulating the flow of fluid into or out of opposite ends of said cylinder, a piston reciprocable in said cylinder, means to restrain said piston against rotation relative to the cylinder, a screw shaft operable to reciprocate the piston, and means for imparting a reciprocating rotary motion to said screw shaft.

PAULO KEMENY.

REFERENCES CITED

The following references are of record in the file of this patent:

UNITED STATES PATENTS

| Number | Name | Date |
|---|---|---|
| 1,800,062 | Fordyce | April 7, 1931 |